(12) United States Patent
Nilsson et al.

(10) Patent No.: US 9,200,898 B2
(45) Date of Patent: Dec. 1, 2015

(54) ESTIMATION OF ROAD INCLINATION

(75) Inventors: Mattias Nilsson, Södertälje (SE); Erik Öhlund, Järna (SE)

(73) Assignee: SCANIA CV AB (SE)

( * ) Notice: Subject to any disclaimer, the term of this patent is extended or adjusted under 35 U.S.C. 154(b) by 97 days.

(21) Appl. No.: 14/009,538

(22) PCT Filed: Apr. 3, 2012

(86) PCT No.: PCT/SE2012/050364
§ 371 (c)(1),
(2), (4) Date: Oct. 3, 2013

(87) PCT Pub. No.: WO2012/138286
PCT Pub. Date: Oct. 11, 2012

(65) Prior Publication Data
US 2014/0032068 A1  Jan. 30, 2014

(30) Foreign Application Priority Data

Apr. 4, 2011 (SE) ........................................ 1150291
Apr. 3, 2012 (SE) ........................................ 1250334

(51) Int. Cl.
*G06F 3/00* (2006.01)
*G06F 19/00* (2011.01)
(Continued)

(52) U.S. Cl.
CPC .............. *G01C 9/00* (2013.01); *B60W 40/076* (2013.01); *F16H 59/66* (2013.01); *G01C 9/06* (2013.01);
(Continued)

(58) Field of Classification Search
CPC ..................... B60W 40/076; B60W 2520/105;
B60W 2510/1005; B60W 2520/10; B60W 2520/125; B60W 2520/30; B60W 2530/16;
B60W 2540/12; B60W 2550/146; G01C 9/00;
G01C 9/06; G01C 9/08; B60T 8/172; F16H 2059/663; F16H 2061/0078; F16H 59/66
USPC ........................................... 701/1, 51, 65, 99
See application file for complete search history.

(56) References Cited

U.S. PATENT DOCUMENTS 6,029,107 A * 2/2000 Sato .................. F16H 61/66259
477/120
6,249,735 B1 6/2001 Yamada et al.
(Continued)

FOREIGN PATENT DOCUMENTS

EP        1 764 580 A1    3/2007
WO    WO 02/01151 A1     1/2002

OTHER PUBLICATIONS

International Search Report dated Sep. 4, 2012 issued in corresponding International patent application No. PCT/SE2012/050364.
(Continued)

*Primary Examiner* — Calvin Cheung
*Assistant Examiner* — Angelina Shudy
(74) *Attorney, Agent, or Firm* — Ostrolenk Faber LLP

(57) ABSTRACT

A method and a system for estimating a road gradient α by using a sensor fusion: Detect whether at least one dynamic process is affecting the vehicle. Estimate gradient α by means of the sensor fusion by joint weighting of at least two input signals to the sensor fusion. The at least two input signals include a signal based on an accelerometer and an input signal based on at least one force equation. At least one of the input signals and/or at least one weighting parameter for the sensor fusion are determined on the basis of detecting whether the at least one dynamic process is affecting the vehicle.

25 Claims, 4 Drawing Sheets

Figure 1:
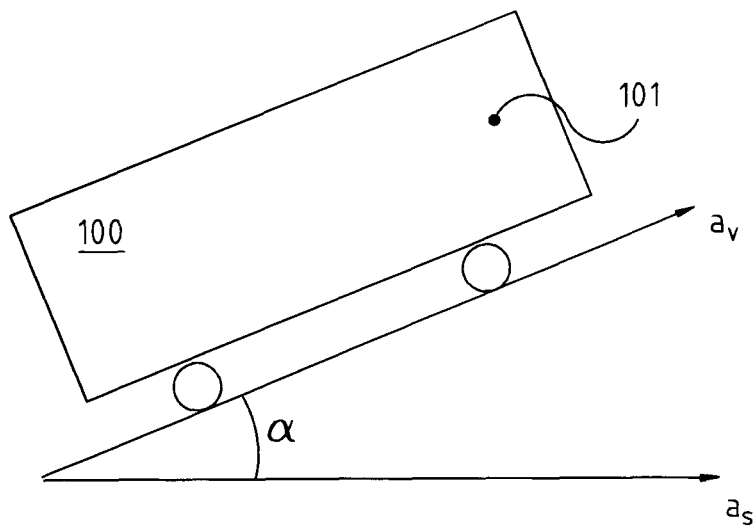

(51) Int. Cl.
*G01C 9/00* (2006.01)
*B60W 40/076* (2012.01)
*G01C 9/06* (2006.01)
*G01C 9/08* (2006.01)
*F16H 59/66* (2006.01)
*F16H 61/00* (2006.01)

(52) U.S. Cl.
CPC .......... *G01C 9/08* (2013.01); *B60W 2510/1005* (2013.01); *B60W 2520/10* (2013.01); *B60W 2520/105* (2013.01); *B60W 2520/125* (2013.01); *B60W 2540/12* (2013.01); *B60W 2550/146* (2013.01); *F16H 2059/663* (2013.01); *F16H 2061/0078* (2013.01)

(56) References Cited

U.S. PATENT DOCUMENTS

| | | | | |
|---|---|---|---|---|
| 6,714,851 | B2* | 3/2004 | Hrovat et al. | 701/70 |
| 7,765,085 | B2* | 7/2010 | Osaki et al. | 702/154 |
| 8,793,035 | B2* | 7/2014 | Yu et al. | 701/1 |
| 9,014,931 | B2* | 4/2015 | Palmer | B60W 10/11 701/51 |
| 2004/0167705 | A1* | 8/2004 | Lingman et al. | 701/124 |
| 2005/0225477 | A1* | 10/2005 | Cong et al. | 342/70 |
| 2007/0010929 | A1* | 1/2007 | Takeda | B60K 28/16 701/82 |
| 2007/0083314 | A1* | 4/2007 | Corigliano et al. | 701/80 |
| 2009/0018732 | A1* | 1/2009 | Choby et al. | 701/51 |
| 2009/0043473 | A1 | 2/2009 | Nakai et al. | |
| 2010/0030437 | A1* | 2/2010 | Kim et al. | 701/65 |
| 2010/0100272 | A1* | 4/2010 | Chen et al. | 701/29 |
| 2013/0253782 | A1* | 9/2013 | Saltsman et al. | 701/51 |
| 2014/0067155 | A1* | 3/2014 | Yu et al. | 701/1 |
| 2014/0172253 | A1* | 6/2014 | Palmer | B60W 10/11 701/56 |
| 2014/0229087 | A1* | 8/2014 | Keates et al. | 701/99 |

OTHER PUBLICATIONS

Sahlholm, P. and Johansson, H., Road grade estimation for look-ahead vehicle control using multiple measurement runs. Control engineering practice. Oct. 2009, vol. 18, pp. 1328-1341.

* cited by examiner

ESTIMATION OF ROAD INCLINATION

CROSS-REFERENCE TO RELATED APPLICATIONS

The present application is a 35 U.S.C. §§371 national phase conversion of PCT/SE2012/050364, filed Apr. 3, 2012, which claims priority of Swedish Patent Application No. 1150291-1, filed Apr. 4, 2011, and Swedish Patent Application No. 1250334-8, filed Apr. 3, 2012, the contents of which are incorporated by reference herein. The PCT International Application was published in the English language.

TECHNICAL FIELD

The present invention relates to a method for estimating a road gradient α, a computer programme for implementing the method, and a system for estimating a road gradient α.

BACKGROUND

Roads, e.g. national highways and motorways, run through landscape with a certain topography which may result in a different gradient α on each section of road. Being able to calculate this gradient α and thereby have access to a relevant value for it is important in various applications in a motor vehicle. An example of such an application is for automatic gear choice, i.e. an application in an automatically operated manual gearbox, where it is important to be able to determine current running resistance and therefore which gear to choose at a given time. Another example of an application is a cruise control which takes the road gradient α into account when determining what torque to demand from an engine of the vehicle. The road gradient α may also be used for example in brake systems and other driver assistance systems.

Estimating the road gradient α is at present often based on an accelerometer which measures the acceleration in a direction of movement of the vehicle. This is illustrated schematically in FIG. 1, in which a motor vehicle 100 is travelling on a section of road which has a gradient α. The vehicle has an acceleration $a_v$, and an accelerometer 101 in the vehicle measures the acceleration $a_s$, which is the acceleration in the horizontal direction. The accelerometer measures and thus produces a signal corresponding to $$a_s = a_v + g \sin(\alpha) \qquad \text{(eq. 1)}$$

in which g is the acceleration due to gravity.

This signal can then be used to determine the road gradient α. At small values of α, sin(α) may be approximated to α, which means that the road gradient α may be determined as $$\alpha = \frac{a_s - a_v}{g} \qquad \text{(eq. 2)}$$

The vehicle's acceleration $a_v$ is thus here subtracted from the $a_s$ value measured by the accelerometer in order to leave only the gravitational component of the measured acceleration.

This procedure for determining the road gradient α works on well on roads where the gradient α and the curvature are slight. On substantially level and straight roads, e.g. motorways, it produces a relatively good estimate of the gradient α, but is far from optimum on roads and sections of roads which are not substantially level and straight.

When a vehicle travels on a road which does not have only slight gradients a and bends, as on minor roads and certain national highways, the accelerometer will not only measure the acceleration, which is important for determining the gradient α, but will also measure other accelerations which are due inter alia to the road's curvature. These other accelerations, which will thus also be included in the signal $a_s$ produced by the accelerometer 101, will then adversely affect the reliability of estimation of the road gradient α.

BRIEF DESCRIPTION OF THE INVENTION

An object of the present invention is to propose an effective and reliable method for estimating a road gradient α. This object is achieved by the method hereof; a computer programme and a system for estimating a road gradient α.

The present invention identifies various dynamic processes which affect a vehicle and their potential for correct estimation of the road gradient α. The invention uses a sensor fusion to jointly weight various methods for determining the gradient α which involve using an accelerometer or a force equation. On the basis of detecting the occurrence of dynamic processes, the invention adjusts this sensor fusion in such a way that the respective advantages of the accelerometer method and the force equation method are utilised while at the same time avoiding their respective disadvantages.

If for example a dynamic process is detected, the sensor fusion is adjusted so that its sensitivity and input signals are optimised for the specific process detected. In estimating the road gradient α when such dynamic processes are current, the adjustment of the sensor fusion, which may be done by a Kalman filter, makes it possible to disregard acceleration components which are due to the dynamic process and not to the actual gradient α. This means that an effective and reliable estimate of the road gradient α is always obtainable by using the invention.

According to an embodiment of the present invention, a weighting of the at least two input signals is done by multiplying at least one of them by a value for measurement noise related to the particular signal. If at least two input signals are used in the sensor fusion at a given time, e.g. at a sampling time, this may be regarded as joint weighting of input signals at that time. For example, joint weighting of the input signals may then take place continuously at each calculation, e.g. at each sampling time.

According to another embodiment of the present invention, weighting of the at least two input signals may be done in such a way that only one of them is taken into account at a given time. Various individual input signals will thus be taken into account at different times, since the choice of input signal will depend on the running situation. At each individual calculation, which may take the form of sampling times, only one input signal is used, but over time various input signals will be weighted jointly by the sensor fusion, since different input signals are chosen at different times. Joint weighting within the time space will thus be achieved according to this embodiment.

By situational adjustment of the sensor fusion it is possible for the sensitivity of the sensor fusion to be increased in the normal case, i.e. when there are no dynamic processes, whereas its sensitivity may be decreased when there is a current dynamic process. The result is a quicker estimate of the gradient α and changes of curvature of the road, which is highly advantageous in, for example, cross-country driving.

An aspect of the present invention uses estimation of the road gradient α in gear choice in a system for automatic gear choice. It is crucial for an automatic gear choice system to have access to a current road gradient α value to enable it to choose the right gear at a specific time. The rapid estimation of the gradient α achieved by the present invention means that a quicker estimate of running resistance can be made, which is very important in optimum choice of gears.

The present invention can thus handle dynamic processes by adjusting the sensor fusion on the basis of them so that the road gradient α may also be estimated on the basis of them. This affords substantial advantages compared with disregarding the dynamic processes, which would entail filtering them out, leading to slower updating or possible freezing of the estimate. This would itself lead to delayed estimation of the gradient α and changes in the curvature of the road and also to incorrect gears being chosen by the automatic gear choice system.

BRIEF LIST OF DRAWINGS

Figure 2:
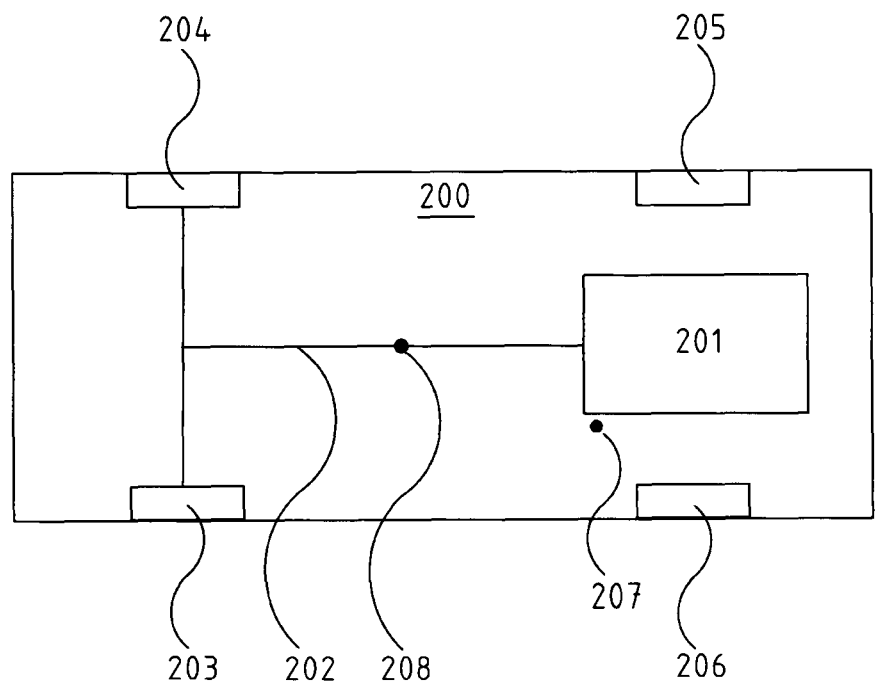
Figure 3:
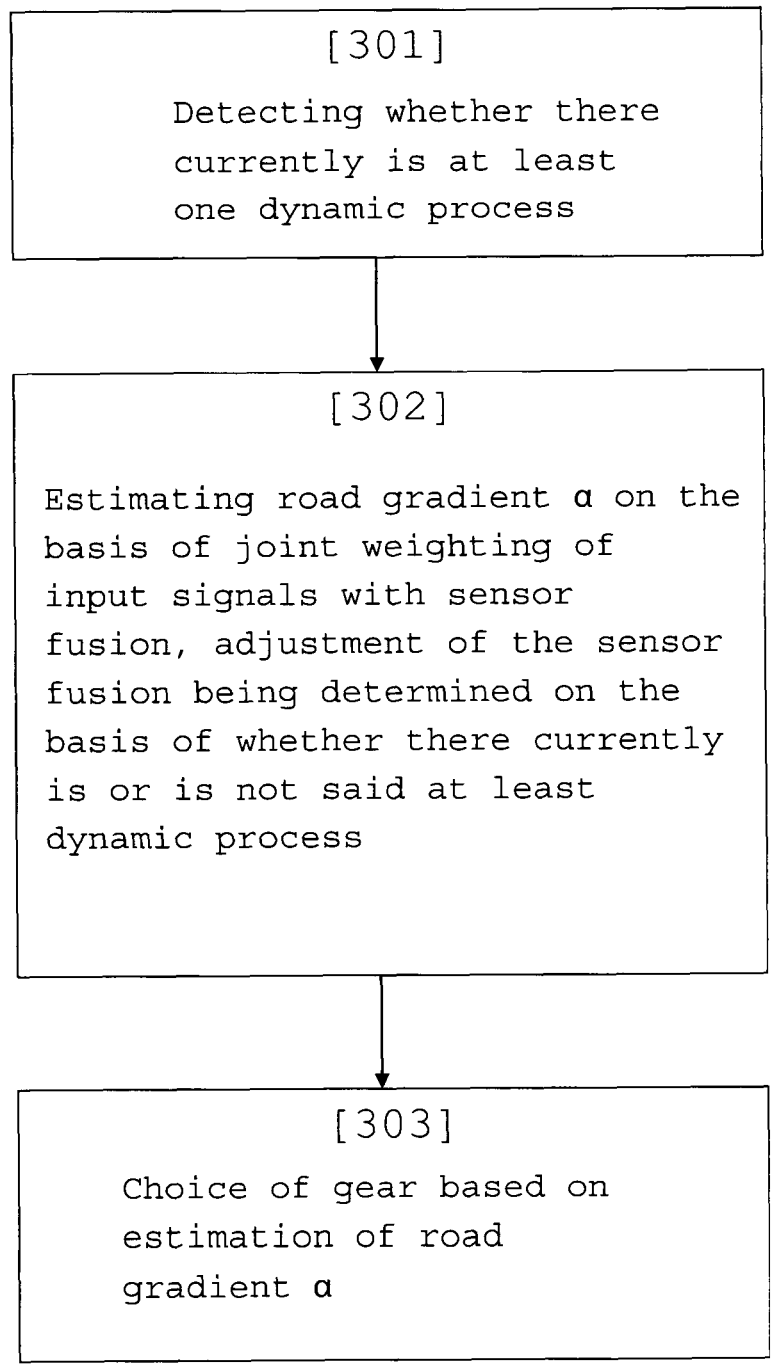
Figure 4:
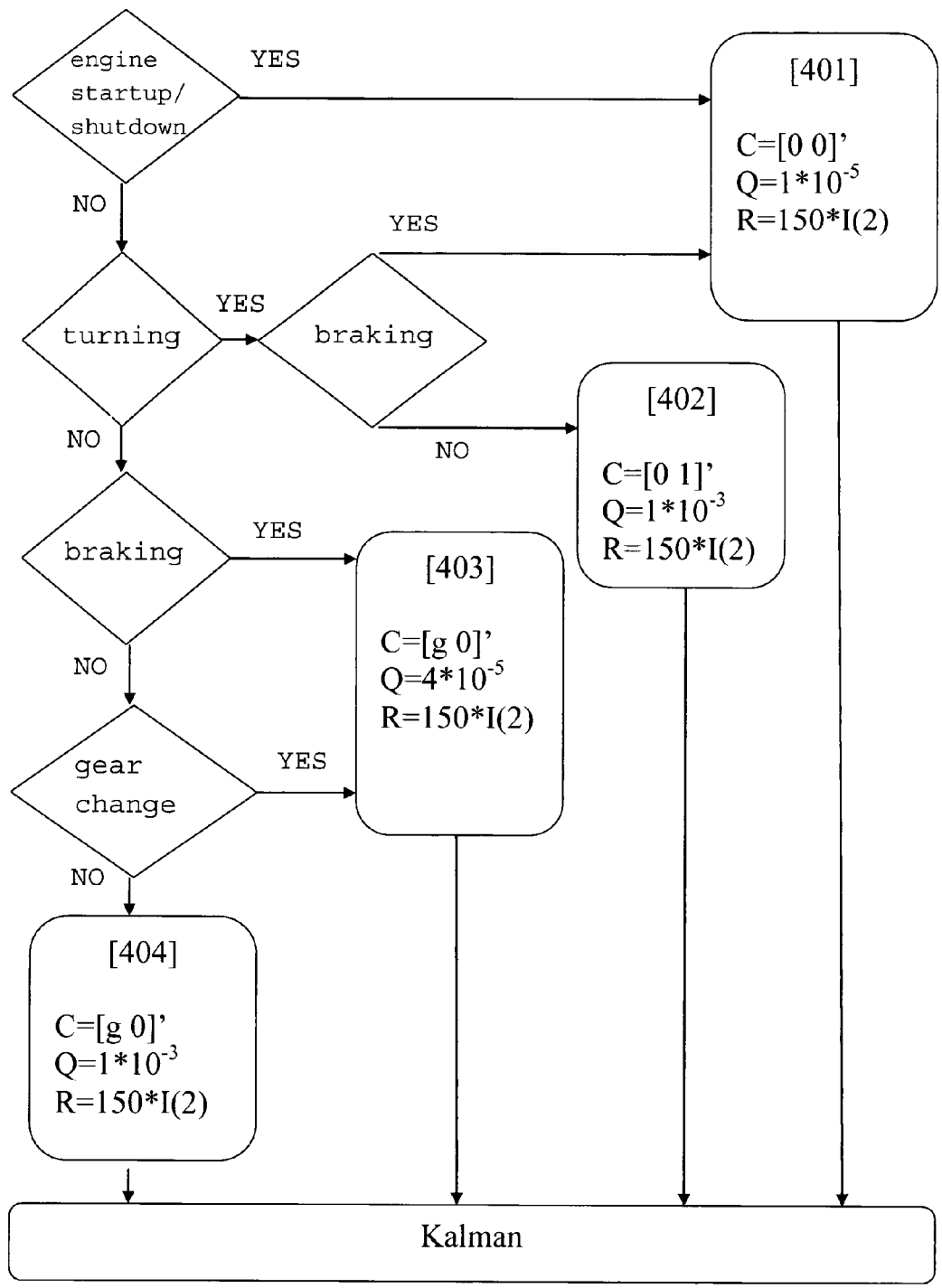
Figure 5:
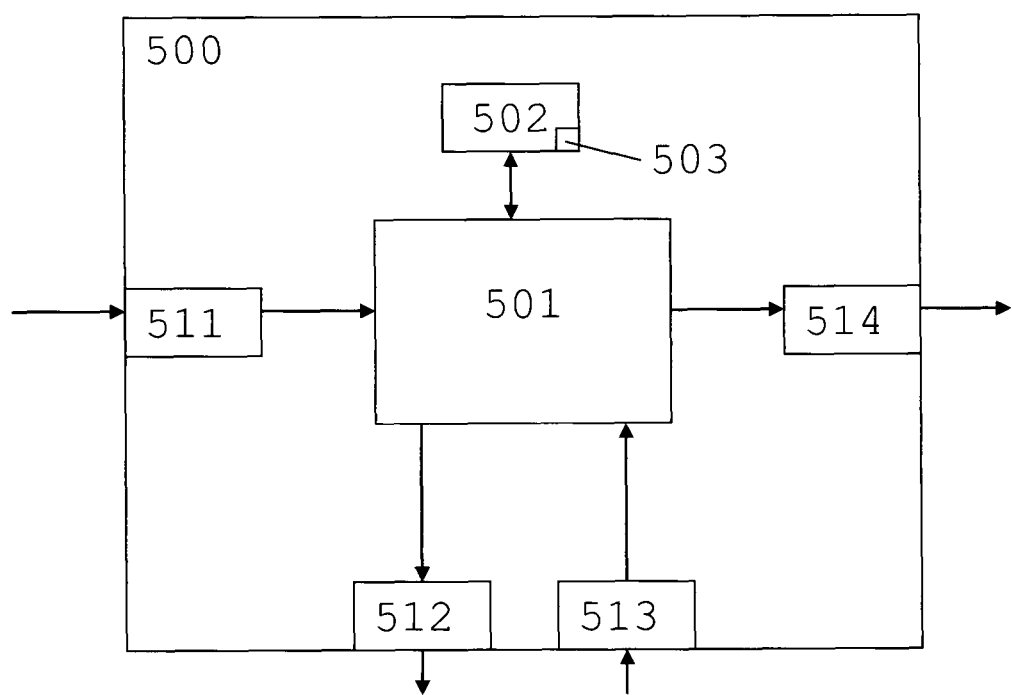

The invention is explained in more detail below with reference to the attached drawings, in which the same reference notations are used for similar items, and in which FIG. 1 depicts schematically a vehicle in relation to a road gradient α, FIG. 2 depicts schematically a vehicle as viewed from above, FIG. 3 is a flowchart for a method according to the invention, FIG. 4 is a flowchart for embodiments according to the invention, and FIG. 5 depicts a control unit.

DESCRIPTION OF PREFERRED EMBODIMENTS

As mentioned above, an accelerometer may be used to produce a signal which can be used in estimating the road gradient α. An estimate of the gradient α based on measurements provided by the accelerometer can be made relatively quickly. An accelerometer-based estimate also provides reliable values for roads where the gradient α and bends are slight.

However, the location of the accelerometer in the vehicle is a problem in that it is normally not situated at the vehicle's turning centre. This is illustrated schematically in FIG. 2, which depicts a vehicle 200 with an engine 201, a power train 202 and wheels 203, 204, 205, 206. The vehicle has a turning centre 208 about which it moves when it turns, the location of which depends inter alia on the length of the vehicle and the location of and spacing between the wheels 203, 204, 205, 206. However, an accelerometer 207 is usually situated close to or in the vicinity of the engine 201, a location which does not usually coincide with the vehicle's turning centre 208. This means that accelerations arising from turning will also be included in the signal $a_s$ produced by the accelerometer 207 if the road changes direction relatively sharply.

The road gradient α may also be determined on the basis of a force equation such as $$\Sigma f = ma \quad \text{(eq. 3)}$$

in which f is the force, m the weight of the vehicle and a an acceleration.

The left member of the force equation may also be expressed as $$\Sigma f = f_d - f_r - f_a - mg \sin(\alpha) \quad \text{(eq. 4)}$$

in which $f_d$ is the motive force, $f_r$ the rolling force due to the rolling resistance, and $f_a$ the air force due to the air resistance.

The road gradient α can be determined on the basis of the force equations 3 and 4. Determining the gradient α on the basis of these equations results in reliable estimates for it on substantially all types of roads, not only substantially level and straight roads but also those with larger gradients and bends. Models for these equations, from which the gradient α can be resolved are often used when these force equations are used to determine it, but these models result in some uncertainty about the estimated value of the gradient α, which is a disadvantage of estimating it on the basis of force equations.

There are thus at least two methods for determining the road gradient α, one of them based on acceleration measurements by an accelerometer 207, the other on at least one force equation. Accelerometer estimation is quick and reliable on relatively straight roads. Force equation estimation is slower than accelerometer estimation and is not usable when the power train is broken, i.e. when the engine's torque is not conveyed to the wheels 203, 204, 205, 206, e.g. when a clutch function is activated or one or more brakes are applied, but it is reliable on all types of roads.

The inventors of the present invention have identified these advantages and disadvantages of the respective estimation methods and propose to combine these methods so that each is used in a to some extent optimum way. The present invention thus combines the advantages of accelerometer estimation with those of force equation estimation while at the same time avoiding the disadvantages of both.

To this end, the present invention uses a sensor fusion which can jointly weight at least two sensor values/input signals produced by one or more sensors/methods. The sensor fusion has here at least two input signals and at least one weighting parameter. If at least one of these at least two input signals and/or at least one weighting parameter is determined or chosen according to the invention, as described in more detail below, the sensor fusion may be used to combine the advantages of accelerometer estimation and force equation estimation.

The present invention involves detecting whether there currently is at least one dynamic process. A dynamic process may here comprise for example at least one sharp turn, one substantial change in acceleration or one substantial change in retardation and may for example be detected on the basis of a braking, a vehicle speed, a radius of curvature or a chosen gear, as described in more detail below. Depending on the result of the detection, the sensor fusion is then conducted by at least one of the at least two input signals for the sensor fusion and/or at least one weighting parameter of the sensor fusion being determined on the basis of whether the vehicle is or is not currently affected by a dynamic process.

The at least two input signals may here be weighted in the joint weighting in such a way for example that the accelerometer is given great influence if a certain or no first dynamic process is current, or they may be weighted in such a way that the force equation has great influence if a certain second dynamic process is current. The weighting may be conducted by one or more of the at least two input signals being weighted to alter the mutual influence of the input signals on the sensor fusion. Similarly, the one or more other weighting parameters in the sensor fusion may be given different values depending on whether or not a certain dynamic process is current. The result is that joint weighting of the input signals takes place at the particular calculation, which may be at a sampling time. Weighting of the at least two input signals is conducted by at least one of them being multiplied by a value based on the magnitude of measurement noise related to this at least one input signal, as described in more detail below.

According to the invention, the sensor fusion is thus adjusted on the basis of whether there currently is or is not a dynamic process, so that the best method at the time, or the best combination of methods at the time, is used in estimating the road gradient α. This means that a reliable value for the gradient α is always obtainable. Moreover, this reliable value is always obtained with least possible delay, which is important in various applications, e.g. where gear choice is based on the road gradient α. According to an embodiment of the invention, the sensor fusion is conducted by means of a Kalman filter for which estimating the road gradient α is the only state. In this case the aforesaid at least one of the two input signals which is determined on the basis of whether there currently is or is not a dynamic process serves as at least one input signal to the Kalman filter. The aforesaid at least one weighting parameter here takes the form of at least one covariance matrix for model noise of this Kalman filter.

A Kalman filter may be described mathematically as $$\hat{x}(t+1|t) = A_t x(t|t)$$

$$\hat{x}(t|t) = x(t|t-1) + L(t)(y(t) - C_t \hat{x}(t|t-1))$$

$$L(t) = P(t|t-1) C_t^T [C_t P(t|t-1) C_t^T + R_t]^{-1}$$

$$P(t+1|t) = A_t P(t|t) A_t^T + Q$$

$$P(t|t) = P(t|t-1) - P(t|t-1) C_t^T [C_t P(t|t-1) C_t^T + R_t]^{-1} C_t P(t|t-1) \quad \text{(eq. 5)}$$

in which
x represents the state vector, which in this case is the road gradient α,
y represents the input signal for the filter,
A represents the model of the system, which in this case is defined as A=1 (described in more detail below),
L represents the amplification for the filter,
C represents the input model for the filter,
Q represents the covariance matrix for the model noise,
P represents the covariance matrix for the estimation error, and
R represents the covariance matrix for the measurement noise.

According to an embodiment of the present invention, the Kalman filter uses the prediction that the road gradient α in the next state will be equal to that in the current state, i.e. A=1.

As may be seen in equation 5, the amplification L for the filter depends on P, C and R, and P itself depends on the covariance matrix for the model noise Q. As mentioned above, according to an embodiment, the covariance matrix for the model noise Q serves as a weighting parameter for the sensor fusion. It is thus this covariance matrix for the model noise Q which is adjusted in the Kalman filter depending on whether a dynamic process is current or not.

The covariance matrix for the model noise Q uses the input signal to weight the value predicted by the filter for a next state, which is predicted to be the same as in the present state, so that greater or smaller weight/influence of the input signal depends on the value of the covariance matrix for the model noise Q. A small value of the covariance matrix for the model noise Q means that only a small change is accepted by the filter, so the filter may be made slower when necessary.

The input signal model C chosen for the filter is based predominantly on the accelerometer or predominantly on the force equation, depending on whether there currently is or is not a dynamic process.

When according to an example of the present invention the Kalman filter has two input signals, one of them based on the accelerometer, the other on the force equation, the input model C becomes a 2×1 vector comprising these two input signals as elements in the vector, i.e. C=[1 g]. If therefore the vector for the input signal model C has for example two elements with values other than zero, the sensor fusion will conduct joint weighting of the two input signals which correspond to these non-zero elements.

The covariance matrix R for the measurement noise is then a diagonal matrix with the covariance for the measurement noise in the diagonal's elements. If for example the covariance matrix R for the measurement noise has two elements with values other than zero and the vector for the input model C has two non-zero elements (as above), the two elements in the covariance matrix R for the measurement noise will result in the weighting between the two input signals which correspond to the elements of the input signal model C when these two input signals are to be jointly weighted in the sensor fusion.

Generally it may be said that the weighting of the input signals by means of the covariance matrix R for the measurement noise depends on the magnitude of the actual measurement noise for each input signal. If for example the accelerometer input signal has substantial measurement noise, the element in the covariance matrix R for the measurement noise which corresponds to the accelerometer input signal's element in the input signal model C will assume a substantial value, causing input signals to be weighted away from the accelerometer input signal towards the force equation input signal. In other words, the two input signals are here weighted so that the force equation input signal is given more influence over the sensor fusion than that of the accelerometer input signal. The values of the elements in the covariance matrix R for the measurement noise may vary within the range 0.0001-150 and determine accordingly the weighting of the input signals to the sensor fusion.

According to an embodiment of the present invention, the sensor fusion involves joint weighting of a model used and the measurement signals. Here the model is evaluated against measured values by comparing predicted values $C_t \hat{x}(t|t-1)$ and measured values y(t) for the at least two input signals, i.e. $y(t) - C_t \hat{x}(t|t-1)$. In addition, the amplification L for the filter is determined on the basis of the measurement noise R. If the measurement noise R has a large value, the amplification L will have a small value, which means that very little of the measured input signals y will be weighted in the equation $\hat{x}(t|t) = x(t|t-1) + L(t)(y(t) - C_t \hat{x}(t|t-1))$. Thus the equation does not then depend on the measured input signals y. Conversely, a small value for the measurement noise R means that the amplification L will assume a large value, which means that the measured input signals y acquire great influence in the sensor fusion. Thus the equation then depends on the measured input values y and gives them great significance.

An important part of the present invention is in identifying various dynamic processes for which the sensor fusion needs to be adjusted in order to be able to quickly produce a reliable value for the road gradient α.

According to an embodiment of the present invention, one or more sharp turns executed by the vehicle constitute such a dynamic process. The at least one turn is regarded as sharp if it has a radius of less than a predetermined value. Such a turn may for example have a radius of less than 25 metres. A turn may also be defined as sharp if it takes longer than a predetermined time and has a predetermined radius. A turn may for example be detected as sharp if it takes longer than two seconds and has such a predetermined radius.

According to an embodiment of the present invention, at least one of the two input signals to the sensor fusion, which may as above be the input signal vector y in the Kalman filter, is weighted so that the input signal which is based on the force equation (equations 3 and 4) is given great influence in the sensor fusion if at least one sharp turn is detected. The fact that the input signal based on the force equation is given great influence by the weighting means here that the force equation signal after the weighting has more influence than the accelerometer signal. Thus the method according to this embodiment chooses to base estimation of the road gradient α more on the force equation and less on the accelerometer when a sharp turn occurs. This means that problems related to the accelerometer not being located at the vehicle's turning centre are avoided. Thus irrelevant accelerations measured by the accelerometer when the road gradient α is estimated are disregarded, resulting in a more exact estimate. According to an embodiment, the input signal based on the force equation is here chosen as sole input signal, e.g. by the input signal based on the accelerometer being so weighted as to be disregarded in the sensor fusion, as described below in relation to FIG. 4.

According to an embodiment of the present invention, a substantial change in an acceleration constitutes a dynamic process for which the sensor fusion has to be adjusted. Such a substantial change may for example occur when accelerating from standstill or when accelerating during a gear change. Such a substantial change in acceleration may affect a mutual relationship between a chassis of the vehicle and a horizontal plane. It may also affect a mutual relationship between a suspension, e.g. a wheel suspension, of the vehicle and a horizontal plane. In other words, the substantial acceleration change may cause the chassis and/or the suspension to rise relative to the horizontal plane. According to an embodiment, an acceleration change is regarded as substantial if it is at least of the order of 1 m/s$^3$.

The sensor fusion is thus adjusted in such a way that at least one of the at least two input signals to the sensor fusion, which may therefore take the form of the input signal vector y to the Kalman filter, is weighted so that the input signal based on the accelerometer 207 is given great influence in the sensor fusion, and that the at least one weighting parameter is set to a value which results in the sensitivity of the sensor fusion being lowered relative to the value which the weighting parameter has when no dynamic process is current. In other words, the value for the weighting parameter is here determined in such a way that the sensor fusion becomes slower than if there was no substantial acceleration change. The fact that the accelerometer signal is given great influence means here that it has more influence than the force equation input signal. In cases where the sensor fusion takes the form of a Kalman filter and the weighting parameter will therefore be the covariance matrix for the filter's model noise Q, the elements in this covariance matrix for the model noise Q are set to a low value, resulting in a slower filter with reduced sensitivity. An exact value of the road gradient α is thus quickly obtained, since the accelerometer can be used in the estimation. According to an embodiment, the input signal based on the accelerometer is here chosen as sole input signal, e.g. by the input signal based on the force equation being so weighted as to be disregarded in the sensor fusion, as described below in relation to FIG. 4.

According to another embodiment of the present invention, a substantial retardation change constitutes a dynamic process for which the sensor fusion has to be adjusted. Such a substantial change may for example occur during retardation on the occasion of gear change, during retardation which arises from partial braking, e.g. while the vehicle is in motion, or during full braking to standstill. According to an embodiment, a retardation change is regarded as substantial if it is at least of the order of 1 m/s$^3$.

According to this embodiment, when a substantial retardation change is detected as a dynamic process, the sensor fusion is adjusted so that at least one of the at least two input signals to the sensor fusion, which may be represented by the input signal vector y of the Kalman filter, is weighted so that the input signal based on the accelerometer 207 is given great influence in the sensor fusion. The at least one weighting parameter, which may take the form of the covariance matrix for the model noise Q of the Kalman filter, is also set to a value which results in the sensitivity of the sensor fusion being lowered relative to the value which the weighting parameter has when no dynamic process is current, so that the sensor fusion becomes slower than if there was no substantial acceleration/retardation change. The fact that the accelerometer signal is here given great influence means that it has more influence than the force equation signal. Thus the sensor fusion is here adjusted in a way substantially similar to the case of a dynamic process in the form of substantial acceleration change. As the accelerometer can be given great influence in the estimation, an exact value for the road gradient α is quickly obtained. According to an embodiment, the accelerometer-based input signal is here chosen as sole input signal, e.g. by the input signal based on the force equation being so weighted as to be disregarded in the sensor fusion, as described below in relation to FIG. 4.

In a similar way to substantial acceleration change, a substantial retardation change may also affect a mutual relationship between the vehicle's chassis or suspension and a horizontal plane. A substantial retardation change may here cause the chassis and/or the suspension to drop relative to the horizontal plane.

According to another embodiment of the present invention, braking during a turn constitutes a dynamic process. According to another embodiment, starting or shutting down an engine also constitutes a dynamic process.

When such braking during a turn or such engine starting or shutting down is detected, the sensor fusion is adjusted so that at least one of the at least two input signals to the sensor fusion, which may take the form of the input signal vector y to the Kalman filter, is determined as corresponding to a previous estimate of the road gradient α. In other words, the Kalman filter is here frozen, which may also be regarded as its not being updated. In equation 5, which describes the Kalman filter, the elements in the matrix for the input signal model C are therefore set to the value 0 (zero), i.e. C=[0 0]. The input signal is thus here determined by the elements of the input signal model matrix C being given the value 0 (zero) so that the input signal corresponds to the previous estimate. This previous estimate will be easy to retrieve from the memory in which it is stored.

We described above how the sensor fusion has to be adjusted to various dynamic processes when they are detected. According to an embodiment, if conversely the detection shows that there are currently no dynamic processes, the sensor fusion is adjusted so that at least one of the at least two input signals is weighted so that a signal based on the accelerometer is given more influence on the sensor fusion than the input signal based on the force equation. As mentioned above, estimates of the road gradient α based on large influence of the input signal from the accelerometer are relatively quick and result in reliable values for roads with large radii of curvature. The at least one weighting parameter is also set to a value which results in the sensitivity of the sensor fusion being adjusted to the accelerometer's noise level. The magnitude of this weighting parameter is therefore determined on the basis of the particular accelerometer used, since different types/makes of accelerometers have different noise levels. According to an embodiment, the input signal based on the accelerometer is chosen here as sole input signal, e.g. by the input signal based on the force equation being weighted in such a way as to be disregarded in the sensor fusion, as described below in relation to FIG. 4.

According to this embodiment, the accelerometer is therefore mainly used to determine the road gradient α when no dynamic process is current, since the accelerometer is best suited to normal running situations.

The embodiments described above which indicate how the sensor fusion is to be conducted depend on detecting whether there currently is or is not a dynamic process. This serves as a basis for choosing how one or more input signals are to be weighted and/or which one or more weighting parameters are to be used in the sensor fusion. This may be regarded as different modes for the sensor fusion being chosen on the basis of this detection, each mode having one or more predetermined input signals and/or one or more predetermined weighting parameters. Where the sensor fusion takes the form of a Kalman filter, each of the modes therefore has a particular input signal vector y and/or one or more particular covariance matrices Q for the model noise.

Detecting whether there currently is a dynamic process may be based on various parameters. According to an embodiment of the invention, this detection may be based at least on a signal related to braking. As described above, the dynamic processes indicated comprise braking. Any suitable signal in the system which indicates that braking is taking place may therefore be used in identifying a dynamic process. Brake signals are usually available in vehicle control systems, so using a brake signal in detection of a dynamic process is easy to implement.

According to an embodiment of the invention, detecting a dynamic process is based at least on a signal related to a speed of the vehicle. This signal may inter alia be used to determine changes in the vehicle's acceleration and/or retardation. Speed signals are usually available in vehicle control systems, which is advantageous when implementing the invention.

According to an embodiment of the invention, detecting a dynamic process is based at least on a signal related to a radius of curvature of a turn being executed by the vehicle. As mentioned above, the dynamic processes comprise turns, so any suitable signal for radius of curvature may be used in this detection. A radius of curvature may inter alia be calculated by analysing mutual differences in speed between outer and inner wheels when the vehicle is turning.

According to an embodiment of the invention, detecting a dynamic process is based at least on a signal related to gear choice. As several of the aforesaid dynamic processes involve gear changing, their identification may be based on information about chosen gears and when gear changes take place. As the present invention may inter alia, as described below, be used in relation to gear changes in a system for automatic gear choice, input signals related to gear choice will typically be available on which to base the identification of dynamic processes. The fact that systems for automatic gear choice have very good control over how and when gear changes will take place may be utilised by this embodiment.

According to an embodiment of the present invention, detecting a dynamic process may be based on any suitable combination of the above parameters, i.e. on any suitable combination of a brake signal, a speed signal, a radius of curvature signal and a gear choice signal.

An aspect of the present invention relates to a method for gear choice in a motor vehicle. According to this method the road gradient α is estimated as described above, i.e. according to any of the embodiments described above of the invention. A gear is then chosen on the basis of the estimated gradient α. This method is for example highly usable in systems for automatic gear choice, since it is central in such a system to take the road gradient α into account when determining running resistance and consequently which gear to choose at a specific time.

One skilled in the art will also appreciate that estimation of the road gradient α may also be used for other applications than for control of automatic gear choice. For example, the gradient α may be used in cruise controls, in brake systems and in other driver assistance systems, e.g. those which help the driver to drive more fuel-economisingly.

FIG. 3 is a flowchart for a method for gear choice according to the invention.

As a first step 301, the method detects whether there currently is at least one dynamic process, i.e. whether the vehicle is for example being affected by a sharp turn, by a substantial change in acceleration or retardation, by braking during a turn, or by starting or shutting down of the engine. As a second step 302, the method estimates the road gradient α by means of a sensor fusion in which at least one of at least two input signals based respectively on the accelerometer and the force equation and/or at least one weighting parameter for the sensor fusion are determined on the basis of whether or not a dynamic process is current.

The first step 301 and second step 302 of the method for gear choice thus together constitute the method for estimating the road gradient α according to the present invention.

As a third step 303, the method chooses a gear on the basis of the estimate of the gradient α.

FIG. 4 depicts a schematic example comprising some of the embodiments described above according to the present invention. The joint weighting of the two input signals based on the accelerometer or the force equation may also be conducted within the time space. This means that the sensor fusion will over time jointly weight the two input signals even if it does not at each individual time take both of them into account. In other words, only one of the input signals is used at a first time and the other is used at a subsequent second time. Over time, however, i.e. over a period which comprises both of these first and second times, joint weighting within the time space will nevertheless be conducted by the sensor fusion when it chooses to base the calculations on both of the input signals.

FIG. 4 illustrates schematically how the input signal model C, the covariance for the model noise Q and the covariance for the measurement noise R are set for different dynamic processes, and how they are set when there is no current dynamic process affecting the vehicle.

If the dynamic process of braking during a turn or starting or shutting down the engine is detected, the sensor fusion is adjusted by C, Q and R being given values according to state 401. In state 401 the elements in the matrix for the input signal model C are set to C=[0 0], which corresponds to the Kalman filter not being updated. The model noise Q is set to the value $1*10^{-5}$, a low value which makes the filter slow. The covariance for the measurement noise R is set to a value 150*I(2), in which I(2) is the unit matrix.

If the dynamic process of turning without braking is detected, the sensor fusion is adjusted by C, Q and R being given values according to state 402. In state 402 the elements in the matrix for the input signal model C are set to C=[0 1], which means that the input signal based on the force equation is chosen. The model noise Q is set to the value $1*10^{-3}$, which makes the filter a little quicker than in state 401. The covariance for the measurement noise R is set to a value 150*I(2), in which I(2) is the unit matrix.

If the dynamic process of substantial change in acceleration, e.g. when accelerating from stationary or accelerating during gear change, or the dynamic process of substantial retardation change, e.g. during gear change or braking, is detected, the sensor fusion is adjusted by C, Q and R being given values according to state 403. In state 403 the elements in the matrix for the input signal model C are set to C=[g 0], which means that the input signal based on the accelerometer is chosen. The model noise Q is set to the value $4*10^{-5}$, a low value which makes the filter relatively slow. The covariance for the measurement noise R is set to a value 150*I(2), in which I(2) is the unit matrix.

If none of these dynamic processes are detected, the sensor fusion is adjusted by C, Q and R being given values according to state 404. In state 404 the elements in the matrix for the input signal model C are set to C=[g 0], which means that the input signal based on the accelerometer is chosen. The model noise Q is set to the value $1*10^{-3}$, which is slightly higher than the value in states 401 and 403 and makes the filter a little quicker than in those states. The covariance for the measurement noise R is set to a value 150*I(2), in which I(2) is the unit matrix.

As illustrated in FIG. 4, the sensor fusion will be adjusted depending on the vehicle's running situations, which means that the accelerometer input signal is chosen in certain running situations and the force equation input signal in other running situations. This results over a period in different estimates of the road gradient α at different times at which the various estimates have different input signals. Over time joint weighting of these various input signals takes place, i.e. joint weighting of the two input signals within the time space.

One skilled in the art will appreciate that the method for estimating the road gradient α and the method for gear choice according to the present invention may also be implemented in a computer programme which, when executed in a computer, causes the computer to apply the method. The computer programme usually takes the form of a computer programme product 503 (in FIG. 5) stored on a digital storage medium, the computer programme being contained in the computer-readable medium of the computer programme product. Said computer-readable medium comprises a suitable memory, e.g. ROM (read-only memory), PROM (programmable read-only memory), EPROM (erasable PROM), flash memory, EEPROM (electrically erasable PROM0, a hard disc unit, etc.

FIG. 5 depicts schematically a control unit 500 comprising a calculation unit 501 which may take the form of substantially any suitable type of processor or microcomputer, e.g. a circuit for digital signal processing (digital signal processor, DSP), or a circuit with a predetermined specific function (application specific integrated circuit, ASIC). The calculation unit 501 is connected to a memory unit 502 which is situated in the control unit 500 and which provides the calculation unit with, for example, the stored programme code and/or stored data which the calculation unit needs to enable it to do calculations. The calculation unit 501 is also adapted to storing partial or final results of calculations in the memory unit 502.

The control unit 500 is further provided with respective devices 511, 512, 513, 514 for receiving and sending input and output signals. These input and output signals may comprise waveforms, pulses or other attributes which the input signal receiving devices 511, 513 can detect as information and which can be converted to signals which the calculation unit 501 can process. These signals are then supplied to the calculation unit. The output signal sending devices 512, 514 are arranged to convert signals received from the calculation unit in order, e.g. by modulating them, to create output signals which can be conveyed to other parts of the system for estimating the road gradient α or the system for gear choice.

Each of the connections to the respective devices for receiving and sending input and output signals may take the form of one or more from among a cable, a data bus, e.g. a CAN (controller area network) bus, an MOST (media oriented systems transport) bus or some other bus configuration, or a wireless connection.

One skilled in the art will appreciate that the aforesaid computer may take the form of the calculation unit 501 and that the aforesaid memory may take the form of the memory unit 502.

An aspect of the present invention relates to a system for estimating a road gradient α in vehicles by using a sensor fusion. The system comprises here a detection means adapted to detecting whether at least one dynamic process is affecting the vehicle. The system comprises also an estimation means adapted to estimating said gradient α. Estimating involves the estimation means determining the adjustment of the sensor fusion according to the method described above, i.e. determining at least one of the at least two input signals and/or at least one weighting parameter for the sensor fusion on the basis of detecting whether any dynamic process is current, so that joint weighting of the at least two input signals is conducted.

An aspect of the present invention relates to a system for gear choice in a motor vehicle. The system comprises here a system for estimating a road gradient α as above, and a gear choice means, e.g. an automatic gearbox, adapted to choosing gears on the basis of the estimate of the road gradient α.

One skilled in the art will also appreciate that the above system may be modified according to the various embodiments of the method according to the invention.

The invention relates also to a motor vehicle 100, e.g. a car, truck or bus, provided with at least a system for estimating the road gradient α or a system for gear choice.

The present invention is not restricted to the invention's embodiments described above but relates to and comprises all embodiments within the protective scope of the attached independent claims.

The invention claimed is:

1. A method for estimating a road gradient α in a vehicle by using a sensor fusion comprising:
   detecting whether at least one dynamic process is affecting said vehicle and outputting a detection result to at least one electronic control unit;
   estimating said gradient a by conducting joint weighting of at least two input signals to said sensor fusion in said at least one electronic control unit, such that
   said at least two input signals comprise an input signal based on an accelerometer received by said electronic control unit and an input signal based on at least one force equation received by said electronic control unit;
   determining at least one of said input signal based on said accelerometer, said input signal based on said at least one force equation and at least one weighting parameter for said sensor fusion on the basis of said detection of whether said at least one dynamic process is affecting said vehicle; and
   providing said road gradient α to an automatic gear change system in said vehicle, said gear change system being configured to select a gear of an engine of said vehicle based at least in part on said road gradient α,
   wherein said dynamic process affects the reliability of at least one of said two input signals when used for estimating said road gradient α.

2. The method according to claim 1, further comprising conducting said sensor fusion by means of a Kalman filter.

3. The method according to claim 2, further comprising causing said at least two input signals to serve as input signals to said Kalman filter and causing said at least one weighting parameter to serve as at least one covariance matrix for model noise Q of said Kalman filter.

4. The method according to claim 3, further comprising causing said Kalman filter to use a prediction that a next state road gradient will be equal to a current state road gradient.

5. The method according to claim 1, wherein said at least one dynamic process affecting said vehicle comprises at least a sharp turn.

6. The method according to claim 5, wherein said sharp turn comprises a smaller radius than a predetermined value.

7. The method according to claim 5, further comprising weighting said at least one of said at least two input signals for giving said input signal based on said force equation greater weight in said sensor fusion than said input signal based on said accelerometer when said detecting shows that said sharp turn is affecting said vehicle.

8. The method according to claim 1, wherein said at least one dynamic process comprises an acceleration change equal to or greater than 1 m/s$^2$.

9. The method according to claim 8, wherein said dynamic process occurs in one of the following situations:
acceleration from stationary; and
acceleration during gear change.

10. The method according to claim 8, wherein when said detecting step results in detection of said acceleration change;
weighting said at least one of said at least two input signals so that said input signal based on said accelerometer is given greater weight in said sensor fusion than said input signal based on said force equation; and
determining said at least one weighting parameter at a value such that a first sensitivity in the sensor fusion for said input signal is less than a second sensitivity for said input signal when no dynamic processes area affecting said vehicle.

11. The method according to claim 8, wherein at least said one dynamic process affects at least one of a position of a chassis and a suspension of a motor vehicle relative to a horizontal plane.

12. The method according to claim 1, wherein said dynamic process comprises a retardation change equal to or greater than 1 m/s$^2$.

13. The method according to claim 12, wherein said dynamic process occurs in one of the following situations:
retardation during gear change;
braking; and
braking to standstill.

14. The method according to claim 12, wherein when said detecting step results in detection of said retardation change,
weighting said at least one of said at least two input signals so that said input signal based on an accelerometer is given greater weight than said input signal based on said force equation; and
determining said at least one weighting parameter at a value such that a first sensitivity in the sensor fusion for said input signal is less than a second sensitivity for said input signal when no dynamic processes are affecting said vehicle.

15. The method according to claim 1, wherein said dynamic process comprises braking during a turn.

16. The method according to claim 15, further comprising determining that said at least two input signals correspond to previous respective estimates of said road gradient if said dynamic process is detected.

17. The method according to claim 1, wherein said dynamic process comprises starting up and shutting down an engine.

18. The method according to claim 1, wherein when said detecting shows no dynamic process affecting said vehicle,
weighting said at least one of said at least two input signals so that said input signal based on an accelerometer is given greater weight than said input signal based on the force equation; and
determining said at least one weighting parameter at a value such that a sensitivity in the sensor fusion for said input signal is adjusted to a noise level of said accelerometer.

19. The method according to claim 1, wherein said detecting is based on at least one of the following signals:
a brake signal;
a signal related to a vehicle speed;
a signal related to a radius of curvature; and
a signal related to gear choice.

20. The method according to claim 1, further comprising causing said sensor fusion to conduct joint weighting of a model with said at least two input signals, such that
said model is used in prediction of values corresponding to said at least two input signals; and
said joint weighting of the model with said at least two input signals is based on a magnitude of measurement noise related to said at least one input signal.

21. The method according to claim 1, further comprising determining said at least one input signal is conducted by its weighting on the basis of a magnitude of measurement noise related to said at least one input signal.

22. The method according to claim 1, wherein said at least one dynamic process comprises at least one of the following:
a sharp turn,
an acceleration change equal to or greater than 1 m/s$^2$,
a retardation change equal to or greater than 1 m/s$^2$,
braking during a turn,
said engine starting and
said engine shutting down.

23. A system for gear choice in a motor vehicle, said system comprising:
a system for estimating a road gradient α in a vehicle by using a sensor fusion, said system for estimating a road gradient α comprising:
a detection device configured to detect whether at least one dynamic process is affecting said vehicle;
an estimation device configured to estimate said gradient α by conducting joint weighting of at least two input signals to said sensor fusion, such that
said at least two input signals comprise an input signal based on an accelerometer and an input signal based on at least one force equation; and
said estimation device is configured to determine at least one of said input signal based on said accelerometer, said input signal based on said at least one force equation and at least one weighting parameter for said sensor fusion on the basis of said detection of whether said at least one dynamic process is affecting said vehicle.

24. The system for gear choice in a motor vehicle according to claim 23 further comprising:
a gear choice device configured for choosing gears of said vehicle on the basis of said gradient α.

25. A non-transitory computer-readable medium comprising computer code contained in the computer readable medium, and which, when the program code is executed by a processor of at least one control unit, causes said at least one control unit to perform the method for estimating a road gradient α in a vehicle by using a sensor fusion, the method comprising:

detecting whether at least one dynamic process is affecting said vehicle and outputting a detection result to at least one electronic control unit;

estimating said gradient a by conducting joint weighting of at least two input signals to said sensor fusion in said at least one electronic control unit, such that said at least two input signals comprise an input signal based on an accelerometer received by said electronic control unit and an input signal based on at least one force equation received by said electronic control unit;

determining at least one of said input signal based on said accelerometer, said input signal based on said at least one force equation and at least one weighting parameter for said sensor fusion on the basis of said detection of whether said at least one dynamic process is affecting said vehicle; and providing said road gradient α to an automatic gear change system in said vehicle, said gear change system being configured to select a gear of an engine of said vehicle based at least in part on said road gradient α, wherein said dynamic process affects the reliability of at least one of said two input signals when used for estimating said road gradient α.

\* \* \* \* \*